(12) United States Patent
Sakraschinsky et al.

(10) Patent No.: US 8,852,431 B2
(45) Date of Patent: Oct. 7, 2014

(54) FILTER DEVICE

(75) Inventors: Michael Sakraschinsky, St. Ingbert (DE); Stefan Hennes, Hangard (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 726 days.

(21) Appl. No.: 13/138,137

(22) PCT Filed: Nov. 3, 2009

(86) PCT No.: PCT/EP2009/007854
§ 371 (c)(1),
(2), (4) Date: Jul. 12, 2011

(87) PCT Pub. No.: WO2010/088938
PCT Pub. Date: Aug. 12, 2010

(65) Prior Publication Data
US 2012/0018364 A1 Jan. 26, 2012

(30) Foreign Application Priority Data
Feb. 5, 2009 (DE) .......................... 10 2009 007 389

(51) Int. Cl.
| | | |
|---|---|---|
| *B01D 35/153* | (2006.01) | |
| *B01D 35/027* | (2006.01) | |
| *B01D 35/30* | (2006.01) | |
| *B01D 29/21* | (2006.01) | |

(52) U.S. Cl.
CPC .............. *B01D 29/21* (2013.01); *B01D 35/027* (2013.01); *B01D 35/30* (2013.01); *B01D 2201/167* (2013.01); *B01D 35/153* (2013.01); *B01D 2201/307* (2013.01)
USPC .......................... 210/235; 210/172.1; 210/443

(58) Field of Classification Search
CPC ..... B01D 35/153; B01D 35/027; B01D 35/30
USPC ........................................ 210/235, 443, 172.1
See application file for complete search history.

(56) References Cited

U.S. PATENT DOCUMENTS

| | | | | |
|---|---|---|---|---|
| 4,052,307 A | * | 10/1977 | Humbert, Jr. ................. | 210/130 |
| 5,362,390 A | * | 11/1994 | Widenhoefer et al. ........ | 210/235 |
| 5,490,929 A | | 2/1996 | Yamamoto | |
| 7,323,103 B2 | * | 1/2008 | Pierret .......................... | 210/235 |
| 2003/0010697 A1 | * | 1/2003 | Sann et al. .................... | 210/234 |

FOREIGN PATENT DOCUMENTS

| | | |
|---|---|---|
| DE | 10 2004 014 149 | 10/2005 |
| DE | 10 2005 046 783 | 4/2007 |

* cited by examiner

*Primary Examiner* — Thomas M Lithgow
(74) *Attorney, Agent, or Firm* — Roylance, Abrams, Berdo and Goodman LLP

(57) ABSTRACT

The invention relates to a filter device having at least one filter element (11) comprising a filter medium (27) disposed between two receiving parts (31, 35) and a connecting device located at the lower receiving part (35) for a fluid connection to a fluid device, in particular to a fluid tank (1), having a connecting part (45) disposed on the connecting device, said connecting part being pretensioned by the action of a first energy store (43) for a motion away from the upper receiving part (31) into a closed position blocking the connecting device, having a further, second energy store (49) for generating a relative motion between the lower receiving part (35) and a closing-off part (17) of the device, and having a sealing device (55) sealing between the lower receiving part (35) and the closing-off part (17) as soon as said part and the lower receiving part (35) make contact with each other under the influence of the second energy store (49).

10 Claims, 4 Drawing Sheets

FILTER DEVICE

The invention relates to a filter device comprising a filter medium disposed between two receiving parts and a connecting means located at the lower receiving part for a fluid connection to a fluid apparatus, in particular a fluid tank.

Filter devices of this type are readily available on the market in a plurality of designs and versions. The are used, for instance, to filter out dirt in fluids, such as hydraulic oil. Fouling of the hydraulic oil takes place in the mounting and in the startup of the respective hydraulic system, and in addition to this initial fouling, fouling can occur during operation, for example, by penetration of dirt at the hydraulic tank as a result of inadequate tank ventilation, pipe feedthroughs, piston rod seals, and the like. If fouling within the fluid stored in the hydraulic tank occurs in hydraulic systems of heavy machinery such as earth moving machinery, excavators, or the like, it can be advantageous to effect filtration directly in the region of the hydraulic tank, for example, by the filter device being installed directly in the tank, the hydraulic oil taken from the tank contents being supplied directly to a filter element to filter out the dirt, which element is held, for example, in a housing in the form of a cartridge, the cleaned fluid then being returned to the tank unit via the connecting means. When the filter medium is used up during operation of these devices so that changing of the housing, which is designed, for example, as a cartridge, is necessary for replacement by a housing which contains a fresh filter medium, it can be useful to block off the fluid connections on connection regions of the filter housing. This prevents the risk that when the housing is dismounted, residual amounts of fluid emerge from the filter housing as a type of leakage flow; this leads to contamination problems in the environment.

With respect to this problem, DE 10 2004 014 149 B4 discloses a solution for a filter device which is installed in a fluid tank and in which there is a shut-off device which can be actuated by turning a rotary slide valve. The rotary slide valve is pivotally mounted on a connecting plate located in the fluid tank and in a clearing rotary position clears a fluid inlet via which the fluid to be cleaned travels to the dirty side via an inlet opening on the filter housing, and an outlet opening of the connecting plate via which cleaned fluid emerges from the clean side of the filter housing through an outlet opening of the filter housing. Both on the inlet opening and also the outlet opening of the filter housing, there is a disk valve which is pretensioned into the closed position and which can be controlled into the respective clearance position by control projections protruding on the rotary slide valve in the rotary release position of the rotary slide valve.

Proceeding from this prior art, the object of the invention is to make available a filter device of the indicated type which is characterized by a very simple construction and user friendliness.

This object is achieved according to the invention by a filter device which has the features of claim 1 in its entirety.

Accordingly, in contrast to the prior art, all components of the blocking means by means of which the fluid connections on the connecting part of the filter element can be cut off are structurally assigned to the lower receiving part of the fluid tank and are designed such that they act to block automatically by the action of the energy storage mechanism assigned to it. Compared to the aforementioned known solution with a rotary slide valve provided on the pertinent fluid apparatus such as the fluid tank, not only does this afford the advantage of the simplified construction which can be economically produced, but operation takes place independently of control parts which can be moved on the pertinent fluid apparatus, such as the rotary slide valve of the aforementioned solution, so that construction is also simplified for the fluid apparatus and operation is simple and convenient.

In especially advantageous exemplary embodiments, the filter element of the device, for movement of the lower receiving part, can be moved relative to the closure part in a shell, which in the vicinity of the upper receiving part has a closed end and on the lower end is closed by a closure part which forms part of the shell, such that when the closure part and the lower receiving part adjoin one another to form a seal, a fluid-tight enclosure of the space between the outside of the filter medium and the shell is formed. Thus the filter element forms a type of filter cartridge which can be easily and conveniently removed and installed for the replacement of the used filter medium as a whole.

The second energy storage mechanism can be advantageously formed by a compression spring which is clamped between the closed end of the shell and the upper receiving part.

If, as is predominantly the case in these devices, the filter medium results in a fluid-permeable support tube which defines an inner filter cavity, the arrangement can be made such that, proceeding from a central opening of the lower receiving part, which opening forms a component of the connecting means, a spring housing extends into the support tube, where on the spring housing a compression spring, which is used as a first energy storage mechanism, is supported, whose other end pretensions the closing part which is movably guided in the spring housing into its closed position which is in contact with the opening edge of the central opening. The blocking means which has the closing part is therefore integrated into the filter cavity, including the pertinent energy storage mechanism, as a result of which the construction of the filter element is compact.

In this case, the arrangement can be advantageously made such that a connecting piece of the assigned fluid apparatus, which piece is designed for the formation of a fluid connection in interaction with the connecting means, can be inserted into the central opening of the lower receiving part and on the edge side is provided with at least one control part which is supported on the closing part in the course of the insertion motion.

If, in this instance, the compression springs are designed such that the spring which is used as the first energy storage mechanism has a stiffer characteristic than the compression spring which forms the second energy storage mechanism, the shell can be moved by tensioning the compression spring which forms the second energy storage mechanism to end the sealing contact of the lower receiving part with the closure unit and the control part of the connecting piece being in contact with the closing part; this can easily take place by the operator pressing on the shell to push in the filter element when a new filter element is being installed. If the pushing or inserting motion continues beyond the point at which the control part makes contact with the closing part, until the compression spring which forms the second energy storage mechanism is completely compressed, a further insertion of the connecting piece into the central opening of the connecting means takes place, where the closing part then can be moved out of the closed position by the control part of the connecting piece, which control part adjoins the closing part, against the action of the compression spring which forms the first energy storage mechanism. In the course of a movement of pushing or insertion of the filter element which takes place in one direction, therefore the two blocking means on the filter element are automatically forced into the clearance position, specifically by neutralizing the seal between the receiving part and closure part and between the closing part and connecting means on the lower receiving part.

With respect to the assignment of the filter device to a fluid apparatus, such as a fluid tank, the arrangement can be advantageously made such that the shell for insertion and removal along the inside wall of an outer housing of the device in which the connecting piece is immovably fixed, is movably guided on the outer periphery of the closure part and that the inside wall has a first displacement section which at a transition point undergoes transition into a second sealing section on the end of the displacement path on which the inside diameter is reduced for sealing interaction with a radial seal located on the closure part. Thus the installation and removal of the filter element are made especially simple and convenient by a low friction displacement motion being enabled within the displacement section, while after traversing the transition point on the end of the displacement path, a good seal of the outer periphery of the closure part is ensured.

In especially advantageous exemplary embodiments, the outer housing can be installed in a fluid tank to whose interior it is functionally connected via the connecting piece and via fluid passages which lead to the closure part of the filter cartridge.

The subject matter of the invention is also a fluid apparatus, especially a fluid tank, with a filter device according to one of claims 1 to 9.

The invention is detailed below using one exemplary embodiment shown in the drawings.

FIG. 1 shows a simplified longitudinal section of one exemplary embodiment of the filter device, the filter element being designed to form a so-called in-tank device for installation in a fluid tank, of which only an upper tank wall section with an outside housing of the device inserted through an installation opening in it is visible, and where the filter element at the beginning of the installation process at the start of its insertion motion into the outer housing is shown;

Figure 1:
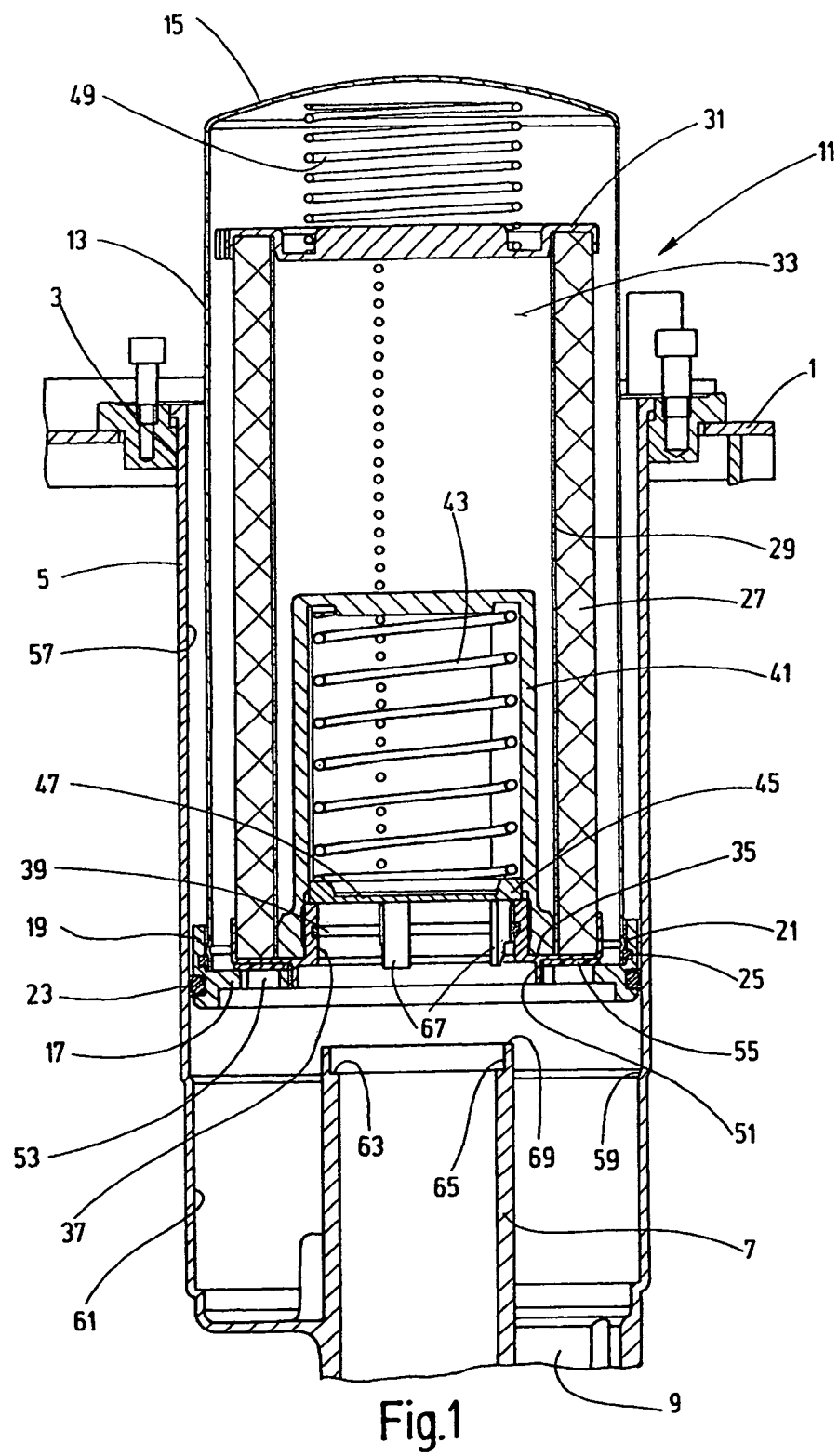

The invention is explained below using one example in which the filter device forms a so-called in-tank filter device, the filter element being connected to a fluid apparatus in the form of a fluid tank. Of the fluid tank, the drawings show only one section of its upper tank wall 1 with an installation opening 3 via which an outer housing 5, which is open on the tank wall opening 3, is installed in the tank. The outer housing 5 on its lower end is connected to the contents of the fluid tank via a connecting piece 7 which is concentric to the longitudinal axis of the housing and via another fluid passage 9. The circular cylindrical outer housing 5 with its inside wall forms a sliding guide for the insertion and withdrawal of a filter element designated as a whole as 11 in FIG. 1. The latter forms a unit which can be replaced as a whole as a so-called filter cartridge. The latter has a shell 13 in the form of a hollow cylinder which is closed on the end 15 which is at the top in the drawings, with the formation of a bulging end surface. On the opposing lower end, the shell 13 has a closure part 17 in the form of a ring body which has been press-molded out of plastic and which on the outer periphery forms an annular edge 19 which projects axially on the outside of the shell 13 and on whose inside wall the fixed connection to the end of the shell 13 is formed by a crimping 21. The outer periphery of the annular edge 19 forms a slide surface on which the filter element 11 is movably guided on the inside wall of the outer housing 5, the seal being formed by the radial seal 23 on the closure part 17. On the inside of the axially projecting annular edge 19, there is another sealing element 25 for sealing relative to the shell 13.

Figure 2:
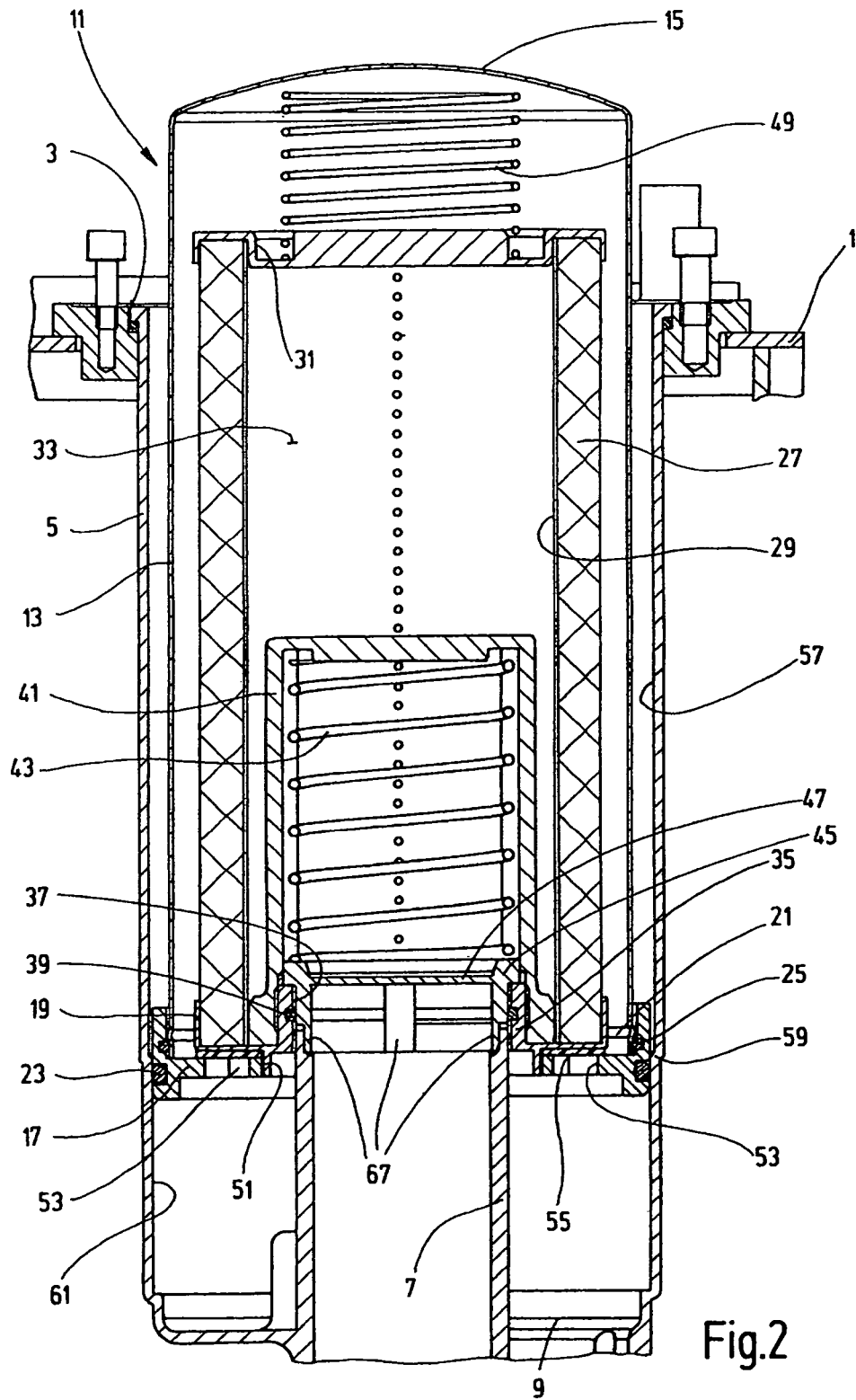
FIG. 2 shows a cutaway corresponding to FIG. 1, the insertion motion of the filter element being continued, but the latter not yet being completely installed.
Figure 3:
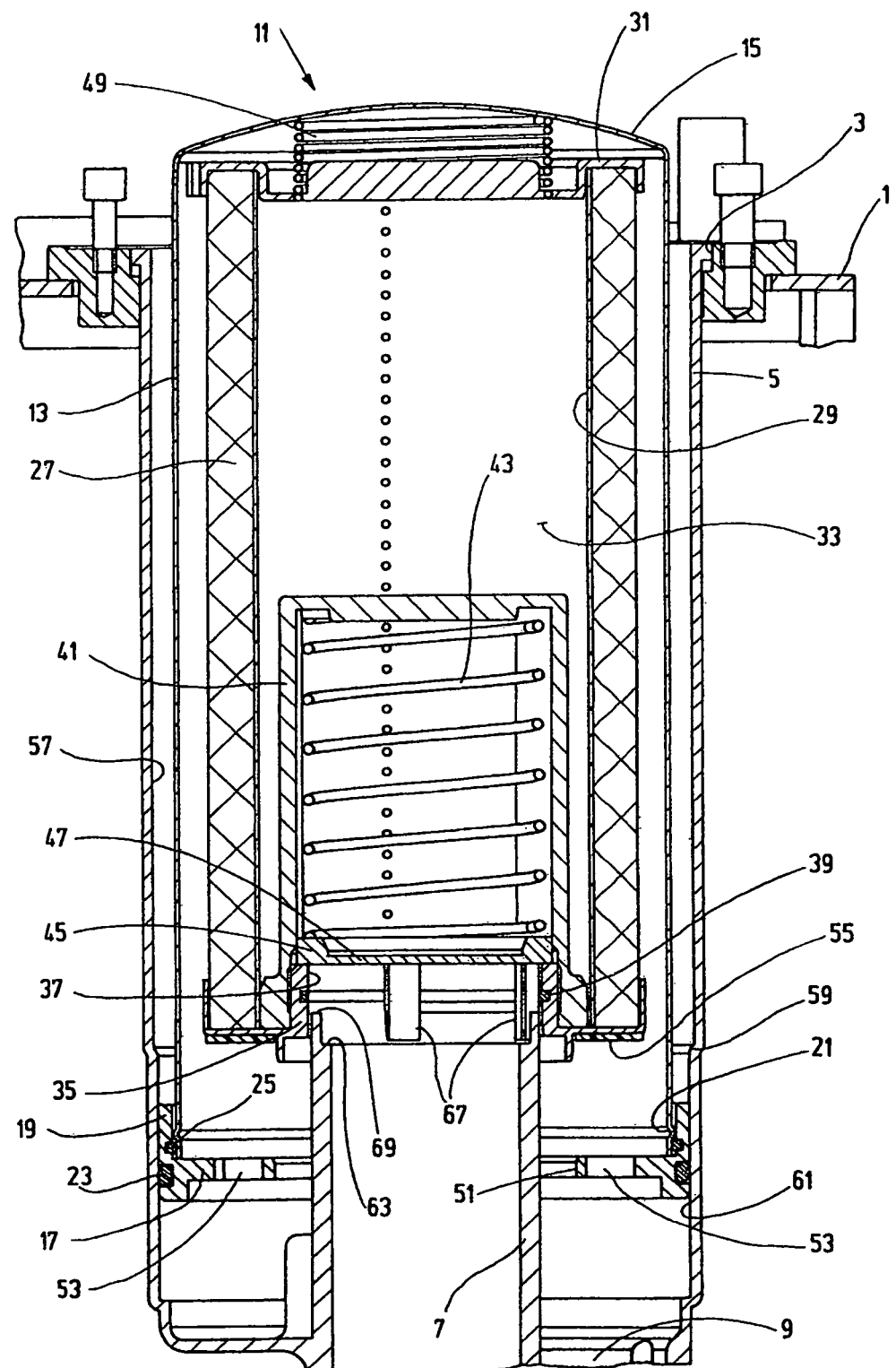
FIG. 3 shows a cutaway corresponding to FIGS. 1 and 2, in which continued insertion motion is shown with the installation process not yet complete.
Figure 4:
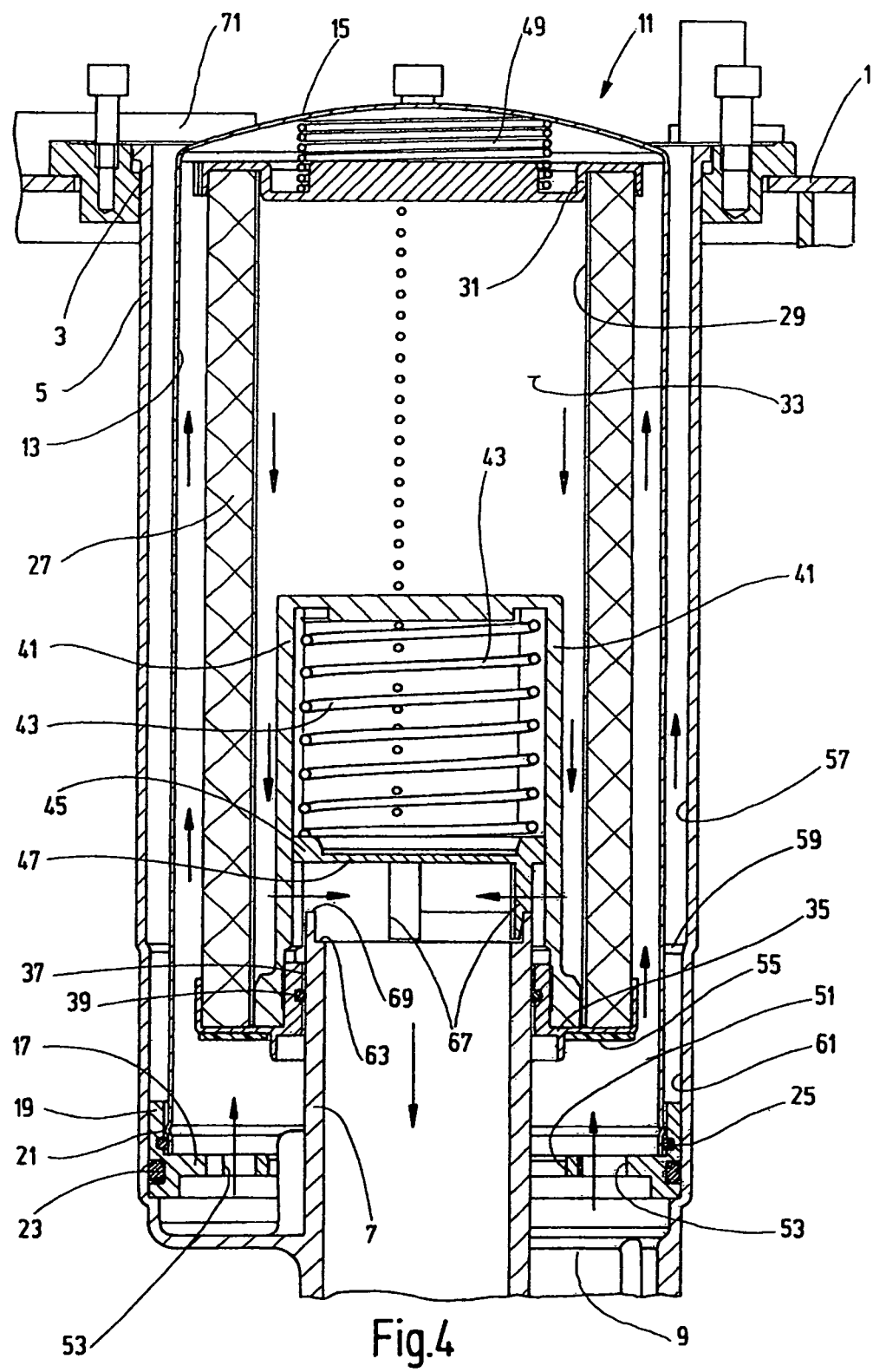
FIG. 4 shows a corresponding cutaway, the operating state which has been reached after the completed installation process being shown.

Within the filter cartridge which has been formed in this way, there is a filter medium 27 in the form of a filter mat which surrounds a fluid-permeable support tube 29. The upper end of the filter medium 27 with the assigned end of the support tube 29 is enclosed by an upper receiving part 31 which closes the inner filter cavity 33 located within the support tube 29 on the upper end and is press-molded from plastic. On the lower end, the filter medium 27 and support tube 29 are enclosed by a lower receiving part 35 which is formed by an annular body which has been press-molded from plastic. This receiving part 35 with its central opening 37 forms a connecting means which in the operating state of the device, which is shown in FIG. 4 detailed below, establishes the fluid connection to the connecting piece 7 and thus the fluid tank. There is a sealing element 39 on the inside wall of the opening 37 to seal the fluid connection. Proceeding from the annulus between the inside of the support tube 29 and the wall surrounding the opening 37, a spring housing 41 extends into the inner filter cavity 33. In the spring housing 41, which has several wall openings which are not shown in the drawings, there is a compression spring 43 which is designated as the first energy storage device here and which, on the one hand, is supported on the upper end of the spring housing 41 and, on the other hand, on a closing part 45 which is axially movable in the spring housing 41 against the action of the compression spring 43, which normally pretensions the closing part 45 into a blocked position at which the connecting means is closed by the closing part 45 with a spring disk-like closing plate 47 adjoining the edge of the opening 37. This situation is shown in FIGS. 1 to 3. Instead of an annular body, which has been press-molded from plastic, it can also be made of other suitable materials, such as an aluminum diecasting or plastic injection molding.

On the upper end of the filter element 11, a compression spring 49, which is designated as the second energy storage mechanism, is clamped between the upper receiving part 31 and the closed end 15 of the shell of 13. In this way, the unit formed between the receiving parts 31 and 35 is pretensioned within the shell 13 normally for contact of the lower receiving part 35 with the closure part 17. This state is shown in FIGS. 1 and 2. In the closure part 17, there are a central opening 51 through which the connecting piece 7 can extend and, on the other hand, passages 53 which lie radially farther to the outside and which are blocked when the force of the compression spring 49 presses the lower receiving part 35 against the closure part 17. In order to form a seal on the passages 53 with this contact, there is a flat ring gasket 55 on the bottom of the lower receiving part 35.

For installation of the filter element 11, the shell 13 is pushed into the outer housing 5, the closure part 17 with its outer periphery being guided on the inside wall of the outer housing 5. For the initial part of the insertion motion, this inside wall has a displacement section 57 to which a sealing section 61 of reduced inside diameter is connected at a transition site 59; when this section is reached in the course of the insertion or pushing-in motion, a reliable seal is formed by the radial seal 23 of the closure part 17. This state is shown in FIGS. 3 and 4.

As FIG. 1 best illustrates, the connecting piece 7 on the upper end has an inner ring shoulder 63 by which an edge-side annulus 65 is formed into which ribs 67 of the closing part 45, which project radially to the bottom, travel in the course of the insertion motion.

If, as shown in FIG. 3, the filter element 11 is pushed farther in, the lower receiving part 35 remains in the same position as is shown in FIG. 2, a sealed fluid connection being established between the connecting piece 7 and the inner filter cavity 33 via the central opening 37 on the receiving part 35. The receiving part 35 therefore remains in its axial position because the compression spring 43, which is stronger than the compression spring 49 located on the upper end, keeps the closing part 45 in its blocked position on the edge of the opening 37 and thus supports the receiving part 35. In this way, as the insertion motion continues, the closure part 17 is pushed into the region of the sealing section 61 in the outer housing 5, see FIG. 3, where the passages 53 are cleared by raising the flat gasket 55, and the upper compression spring 49 is compressed.

If, proceeding from this state, the filter element 11 is pressed farther into the outer housing 5, the action of the force of the compression spring 43 is overcome due to the upper receiving part 31 adjoining the upper end 15 of the shell 13. Thus the connecting piece 7 with its upper edge 69 acts as a control part which acts on the closing part 45 via its ribs 67 and which moves the closing part 45 against the action of the compression spring 43 into the spring housing 41, as a result of which the operating state shown in FIG. 4 is attained, in which both fluid travels to the outer side of the filter medium 27 via the cleared passages 53, and also cleaned fluid travels out of the inner filter cavity 33 into the connecting piece 7 and thus into the interior of the fluid tank past the closing part 45 which has been forced into the clearance position. In this operating state, in which the two compression springs 43 and 49 are tensioned, the filter element 11 is secured in the installation position by a cover 71, which is indicated schematically only in FIG. 4. The fluid flow which prevails in the operating state during the filter process is illustrated in FIG. 4 with flow arrows which are not numbered.

It is apparent that the device is characterized by a high degree of user friendliness. Only the cover 71 need be detached for the process of replacing a filter element 11 with the used-up filter medium 27. The action of the two tensioned compression springs 43 and 49 moves the filter element 11 automatically out of the operating position shown in FIG. 4 first into the intermediate position shown in FIG. 3, after which, as the upper compression spring 49 is released, further withdrawal into the position shown in FIG. 2 automatically takes place, in which the filter cartridge protrudes so far out of the outer housing 5 that it can be comfortably grasped. At the same time, the inner filter cavity 33 is closed by the closing part 45 which is located in the blocking position, and the space on the outside of the filter medium 27 is likewise closed on the closure part 17 because the flat gasket 55 is kept in contact with the passages 53 of the closure part 17 by the compression spring 49.

The invention claimed is:

1. A filter device with at least one filter element (11) comprising a filter medium (27) disposed between two receiving parts (31, 35) and a connecting means located at the lower receiving part (35) for a fluid connection to a fluid apparatus, in particular to a fluid tank (1), with a closing part (45) which is disposed on the connecting means and which is pretensioned by the action of a first energy storage mechanism (43) for a movement proceeding away from the upper receiving part (31) into a closed position which blocks the connecting means, with a further second energy storage mechanism (49) for producing a relative motion between the lower receiving part (35) and a closure part (17) of the device and with a sealing means (55) which acts to seal between the lower receiving part (35) and the closure part (17) as soon as the latter and the lower receiving part (35) are in contact with one another under the influence of the second energy storage mechanism (49).

2. The filter device according to claim 1, characterized in that the filter element (11) of the device for movement of the lower receiving part (35) can be moved relative to the closure part (17) in a shell (13) which in the vicinity of the upper receiving part (31) has a closed end (15) and on the lower end is closed by a closure part (17) which forms part of the shell (13) such that when said closure part and the lower receiving part (35) adjoin one another to form a seal, a fluid-tight enclosure of the space between outside of the filter medium (27) and the shell (13) is formed.

3. The filter device according to claim 2, characterized in that the second energy storage mechanism in the form of a compression spring (49) is clamped between the closed end (15) of the shell (13) and the upper receiving part (31).

4. The filter device according to claim 1, characterized in that a filter medium (27) surrounds a fluid-permeable support tube (29) which defines an inner filter cavity (33), into which tube, proceeding from a central opening (37) of the lower receiving part (35), which opening forms a component of the connecting means, a spring housing (41) extends, on which a compression spring (43), which is used as a first energy storage mechanism, is supported and whose other end pretensions the closing part (45) which is movably guided in the spring housing (41) into its closed position which adjoins the opening edge of the central opening (37).

5. The filter device according to claim 4, characterized in that a connecting piece (7) of the assigned fluid apparatus, which piece is designed for the formation of a fluid connection in interaction with the connecting means, can be inserted into the central opening (37) of the lower receiving part (35) and on the edge side is provided with at least one control part (63, 69) which is supported on the closing part (45) in the course of the insertion motion.

6. The filter device according to claim 5, characterized in that the shell (13) can be moved by tensioning the compression spring (49) which forms the second energy storage mechanism to end the sealing contact of the lower receiving part (35) with the closure part (17) and the control part (63, 69) of the connecting piece (7) being in contact with the closing part (45).

7. The filter device according to claim 6, characterized in that when the insertion of the connecting piece (7) into the central opening (37) of the connecting means goes beyond the point at which contact with the closure part (45) is reached, the closing part (45) can be moved out of the closed position by the control part (63, 69) of the connecting piece (7), which control part adjoins the closing part, against the action of the compression spring (43) which forms the first energy storage mechanism.

8. The filter device according to claim 5, characterized in that the shell (13) for insertion and removal along the inside wall of an outer housing (5) of the device in which the connecting piece (7) is fixed immovably, is movably guided on the outer periphery of the closure part (17) and that the inside wall has a first displacement section (57) which at a transition point (59) undergoes transition into a second sealing section (61) on the end of the displacement path on which the inside diameter is reduced for sealing interaction with a radial seal (23) which is located on the closure part (17).

9. The filter device according to claim 8, characterized in that the outer housing (5) can be installed in a fluid tank (1) to whose interior it is functionally connected via the connecting piece (7) and via fluid passages (9) which lead to the closure part (17) of the filter cartridge.

10. A fluid apparatus, in particular fluid tank (1), with a filter device according to claim 1.

\* \* \* \* \*